United States Patent
Alhandy

(10) Patent No.: US 12,271,933 B2
(45) Date of Patent: Apr. 8, 2025

(54) SECURE SYSTEM AND METHOD FOR REMOTE MANUFACTURING

(71) Applicant: 3DCONTINGENCY, LLC, Jacksonville Beach, FL (US)

(72) Inventor: Hassen Damon Alhandy, Jackson, MO (US)

(73) Assignee: 3DContingency, LLC, Jacksonville Beach, FL (US)

( * ) Notice: Subject to any disclaimer, the term of this patent is extended or adjusted under 35 U.S.C. 154(b) by 748 days.

(21) Appl. No.: 17/090,992

(22) Filed: Nov. 6, 2020

(65) Prior Publication Data

US 2022/0148058 A1 May 12, 2022

(51) Int. Cl.
*H04L 29/06* (2006.01)
*B33Y 50/00* (2015.01)
(Continued)

(52) U.S. Cl.
CPC .......... *G06Q 30/0601* (2013.01); *B33Y 50/00* (2014.12); *G06Q 20/1235* (2013.01); *G06Q 20/127* (2013.01); *G06Q 30/0283* (2013.01); *G06Q 30/0633* (2013.01); *G06Q 50/04* (2013.01); *G07C 3/005* (2013.01); *G05B 2219/49023* (2013.01)

(58) Field of Classification Search
CPC .......... G06Q 30/0601; G06Q 30/0283; G06Q 30/0633; G06Q 20/1235; G06Q 20/127; G06Q 50/04; B33Y 50/00; G07C 3/005; G05B 2219/49023
See application file for complete search history.

(56) References Cited

U.S. PATENT DOCUMENTS

| 8,970,867 B2 | 3/2015 | Baldwin et al. |
| 9,558,330 B2 | 1/2017 | Pogorelik et al. |

(Continued)

FOREIGN PATENT DOCUMENTS

| CN | 109703032 A | 5/2019 |
| KR | 20180115940 A | 10/2018 |

OTHER PUBLICATIONS https://secured3d.com/.
https://slic3r.org/.

*Primary Examiner* — Evans Desrosiers
(74) *Attorney, Agent, or Firm* — Martin IP Law Group; C. Richard Martin

(57) ABSTRACT

A manufacturing system for securely and remotely manufacturing a three-dimensional (3D) object can include the mechanical processing machine, a security module, and a system server. The mechanical processing machine can be configured to manufacture the 3D object. The security module can be configured to transmit the machine instructions to the mechanical processing machine. The system server can include a processor, a memory, and a marketplace subsystem. The memory can have a tangible, non-transitory computer readable medium with processer-executable instructions stored thereon. The marketplace can include a content creator module and a user module. The content creator module can be configured to receive and store at least one of 3D object data, interfacing settings, the machine instructions, and combinations thereof. The mechanical processing machine does not receive the 3D object data.

23 Claims, 3 Drawing Sheets

(51) Int. Cl.
*G06Q 20/12* (2012.01)
*G06Q 30/0283* (2023.01)
*G06Q 30/0601* (2023.01)
*G06Q 50/04* (2012.01)
*G07C 3/00* (2006.01)

(56) References Cited

U.S. PATENT DOCUMENTS

| | | | |
|---|---|---|---|
| 2015/0350278 A1 | 12/2015 | Isbjornssund et al. | |
| 2016/0262442 A1* | 9/2016 | Davila | A23P 20/15 |
| 2017/0359315 A1* | 12/2017 | Zhang | B33Y 50/00 |
| 2018/0089747 A1 | 3/2018 | Tapley et al. | |
| 2021/0103270 A1* | 4/2021 | Mohammad | G06F 3/1288 |

* cited by examiner

SECURE SYSTEM AND METHOD FOR REMOTE MANUFACTURING

FIELD

The present disclosure relates to the field of remote manufacturing and, more particularly, to a secure system and method for remote manufacturing.

INTRODUCTION

Due to advancements in technology, businesses and contractors are able to sell the ability to manufacture a three-dimensional (3D) object, instead of selling the 3D object itself. This is especially true in additive manufacturing or 3D printing. 3D printing is a unique form of "printing" being related to traditional rapid prototyping technology. 3D printing is a process of joining materials to make objects from 3D model data, usually layer upon layer, as opposed to subtractive manufacturing methodologies, such as traditional machining where the object is shaped by removing material.

During the last decade, 3D printers have become common tools for producing 3D objects from 3D object data (e.g., computer-aided design (CAD) models and animation models). As a consequence, the use of rapid prototyping is now commonplace in many industries and do-it-yourself (DIY) circles. Online marketplaces have emerged to cater to the 3D printing market. These marketplaces allow content creators to upload 3D object data to be sold to users. Certain marketplaces permit the user to purchase the 3D object data itself. This can be undesirable because the 3D object data can often be easily duplicated and redistributed. One proposed solution to this problem is limit the marketplace to purchasing instances of manufacturing the 3D object without affording access to the 3D object data, where the purchaser can then print the 3D object using their own mechanical processing machine, such as a 3D printer. However, this solution can still involve transmission of the 3D object data to the 3D printer, where the 3D object data can be intercepted and copied by the user or by others for unauthorized purposes.

There is a continuing need for a manufacturing system and method that can securely and remotely manufacture a 3D object. Desirably, the system and method permit a user to customize how the manufacturing is remotely controlled.

SUMMARY

In concordance with the instant disclosure, a manufacturing system and that can securely and remotely manufacture a three-dimensional (3D) object, and which permits a user to customize how the manufacturing is remotely controlled, has been surprisingly discovered.

In certain embodiments, manufacturing systems for securely and remotely manufacturing a 3D object can include a mechanical processing machine, a security module, and a system server. The mechanical processing machine can be configured to manufacture the 3D object. The security module can be in communication with the mechanical processing machine. The security module can be configured to transmit machine instructions to the mechanical processing machine. The machine instructions can be configured to instruct the mechanical processing machine to manufacture the 3D object. The system server can be in communication with the security module. The system server can include a processor, a memory, and a marketplace subsystem. The memory can have a tangible, non-transitory computer readable medium with processer-executable instructions stored thereon. The marketplace can include a content creator module and a user module. The content creator module can be configured to receive and store at least one of 3D object data, interfacing settings, the machine instructions, and combinations thereof. The user module can be configured to permit a user to order the manufacture of the 3D object. The mechanical processing machine does not receive the 3D object data.

In certain embodiments, manufacturing systems for securely and remotely manufacturing a 3D object can include a mechanical processing machine, a security module, and a system server. The mechanical processing machine can be configured to manufacture the 3D object. The security module can be in communication with the mechanical processing machine. The security module can be configured to transmit the machine instructions to the mechanical processing machine. The machine instructions can be configured to instruct the mechanical processing machine to manufacture the 3D object. The system server can be in communication with the security module. The system server can have a processor, a memory, and a marketplace subsystem. The memory can include a tangible, non-transitory computer readable medium with the processor-executable instructions stored thereon. The marketplace subsystem can have a content creator module and a user module. The content creator module can be configured to receive and store at least one of 3D object data, the machine instructions, the interfacing settings, and combinations thereof. The user module can be configured to permit a user to order the manufacturing of the 3D object data and selectively modify the interfacing settings before the 3D object data is converted to machine instructions. The processor-executable instructions of the system server can be configured to convert the 3D object data and the interfacing settings to the machine instructions. The processor executable instructions can also be configured to transmit the machine instructions to the security module. The mechanical processing machine does not receive the 3D object data.

In certain embodiments, methods of securely and remotely manufacturing three-dimensional (3D) object data are provided. Such methods can include providing a manufacturing system, as described herein, including a mechanical processing machine, a security module, and a system server. The system server can receive and store the at least one of 3D object data, the machine instructions, the interfacing settings, and combinations thereof and can receive an order for manufacturing the 3D object from the user. The user can selectively modify the interfacing settings. The 3D object data and the interfacing settings can be converted to machine instructions. The security module can transmit the machine instructions to the mechanical processing machine. The mechanical processing machine can manufacture the 3D object directed by the machine instructions. The mechanical processing machine does not receive the 3D object data.

While this disclosure can be directly applied to 3D printers or additive manufacturing, it should be appreciated that the present disclosure can be applied to other manufacturing processes, such as subtractive manufacturing.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Figure 1:
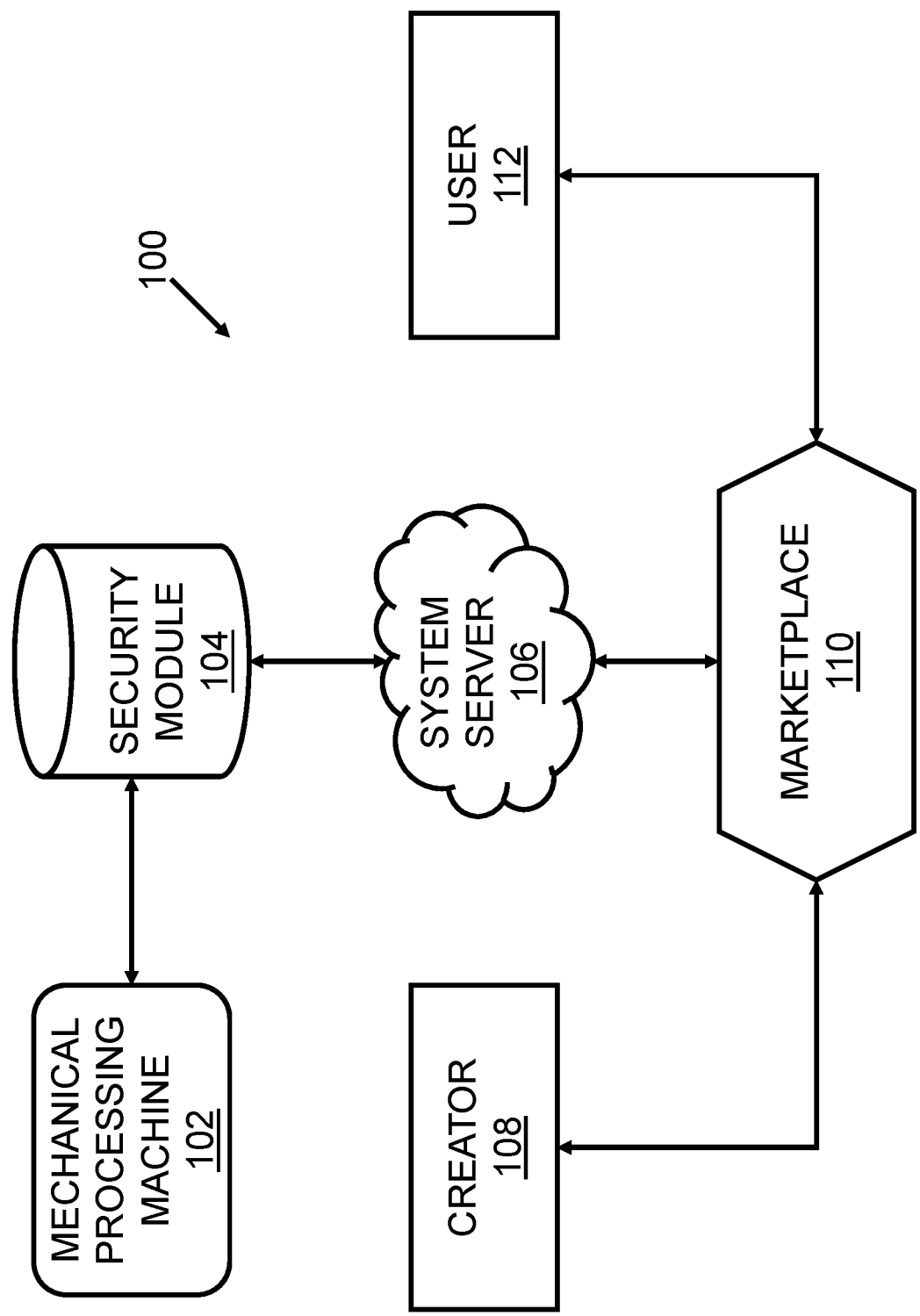
FIG. 1 is schematic illustrating one embodiment of a manufacturing system according to the present technology, showing a mechanical processing machine, a system server, and a security module.
Figure 2:
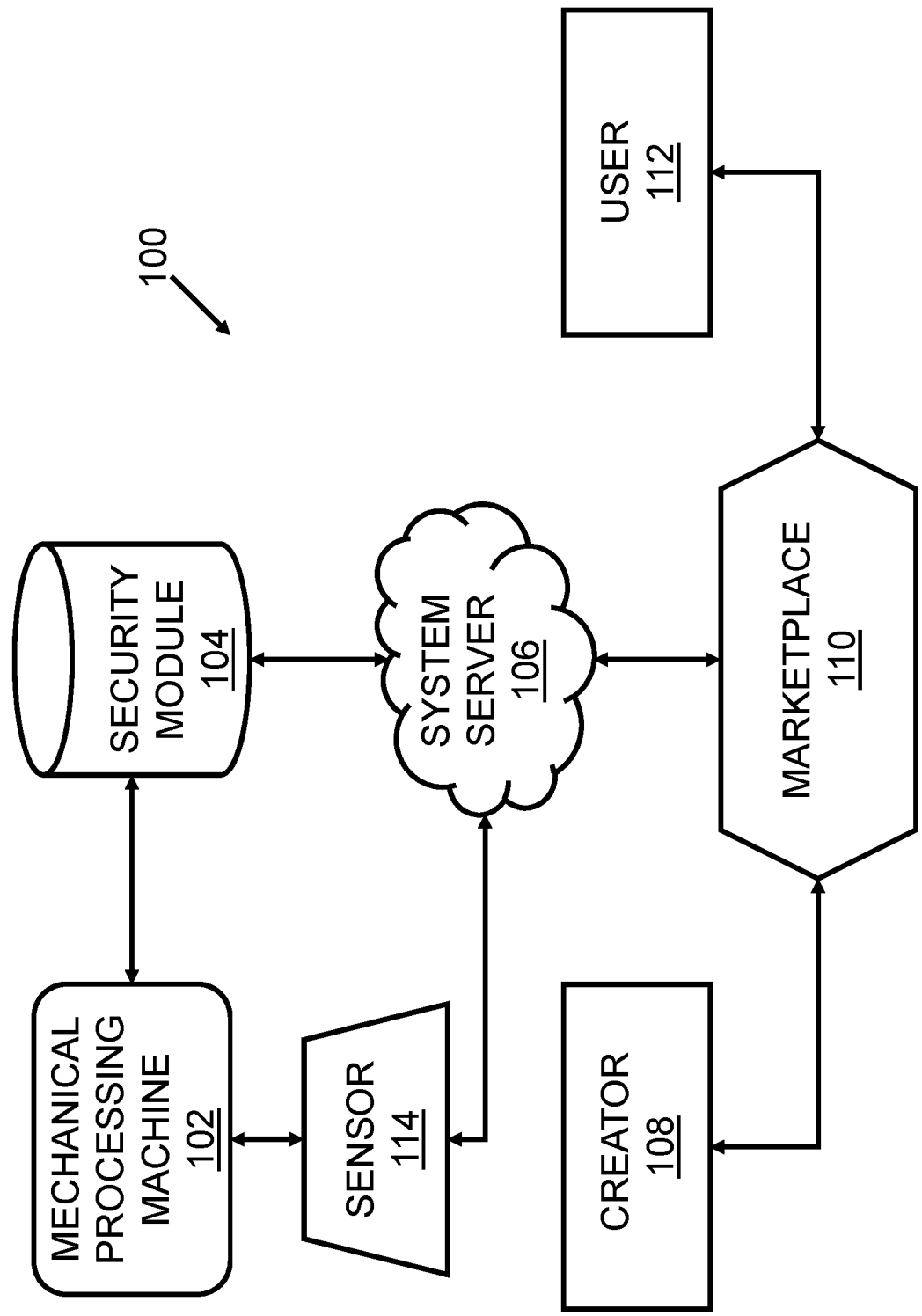
FIG. 2 is a schematic illustrating another embodiment of a manufacturing system according to the present technology, showing a mechanical processing machine, a system server, a security module, and a sensor.

With reference to FIGS. 1-2, embodiments of a manufacturing system 100 for securely and remotely manufacturing a three-dimensional (3D) object are shown. The manufacturing system 100 can include a mechanical processing machine 102, a security module 104, and a system server 106. However, it should be appreciated that a skilled artisan can employ additional features and structures for the manufacturing system 100, within the scope of this disclosure.

The mechanical processing machine 102 can be configured to manufacture the 3D object based on 3D object data. The 3D object data can include a 3D visual representation of a physical object or physical objects that can be constructed through 3D geometry. The 3D visual representations can be modified, scaled, transformed, created, and converted. The 3D object data can include one or more 3D object files. A single 3D object file can be used to manufacture the 3D object or a plurality of independent 3D objects. Each of the independent 3D objects can form a part of an assembly. Desirably, this can permit a content creator 108 to store an entire assembly including the independent 3D objects within the single 3D object file. However, it should be appreciated that the content creator 108 can also store the independent 3D objects across multiple 3D object files, if desired.

A non-limiting example of the 3D object data includes a STL file. The STL file is a file format that is native to stereolithography computer-aided design (CAD) software. The STL file can describe the surface geometry of the 3D object without representation of color, texture or other common CAD model attributes. The STL format can specify both ASCII and binary representations. It should be appreciated that one skilled in the art can select other 3D object file formats, within the scope of this disclosure.

The mechanical processing machine 102 can manufacture the 3D object through a process that can include depositing, joining, or solidifying material. The material can be added together (such as liquid molecules or powder grains being fused together), typically layer by layer. However, it should be appreciated that a person skilled in the art can configure the mechanical processing machine 102 to perform different types of additive manufacturing processes, as desired. Non-limiting examples include fused filament fabrication (FFF), vat photopolymerization, power-bed fusion (PBF), material jetting, binder jetting, ultrasonic additive manufacturing (UAM), laminated object manufacturing (LOM), and directed energy deposition (DED). In addition, it should be further appreciated that the mechanical processing machine 102 be also be configured to perform different types of manufacturing processes, such as subtractive manufacturing, within the scope of this disclosure. Examples of subtractive manufacturing include computer numerical control (CNC) automated machining tools, such as cutting tools, drills, lathes, mills, waterjets, etc. One or more various CNC machining tools can be configured to receive 3D object data (e.g., CAD models), as described herein, in order to manufacture a 3D object by removing material from one or more blanks or bar stocks of one or more materials.

In certain embodiments, the mechanical processing machine 102 includes a consumer grade 3D printer. Desirably, consumer grade 3D printers can be obtainable by a wide range of consumers. However, it should be appreciated that a skilled artisan can select different types of machines for the mechanical processing machine 102, as desired. For example, the mechanical processing machine 102 can be large enough for industrial applications for businesses. Advantageously, this permits a wide range of users, e.g., independent consumers to large corporations, to utilize the technology of the present disclosure.

The security module 104 can be in communication with the mechanical processing machine 102 and the system server 106. The security module 104 can communicate via a local area network (LAN) and a wide area network (WAN); e.g., the Internet. It should be appreciated that one skilled in the art can employ other communications methods for the security module 104, the mechanical processing machine 102, and the system server 106, as desired.

The security module 104 can be configured to receive machine instructions from the system server 106. The security module 104 can be configured to transmit the transmit machine instructions to the mechanical processing machine 102. The machine instructions can be configured to direct the mechanical processing machine 102 to manufacture the 3D object. The machine instructions can include commands, such as directing the movement of the mechanical processing machine 102 without including the 3D object data. It is believed this can prevent unauthorized capture, copying, redistribution, and/or modification the 3D object data because the security module 104 does not transmit the 3D object data to the mechanical processing machine 102. Non-limiting examples of the machine instructions can include CNC programming instructions, mechanical processing machine code, and G-code machine instructions. G-code machine instructions can tell computerized machine tools how to make something. The "how" is defined by G-code machine instructions that can be provided to the mechanical processing machine 102 which tells the motors where to move, how fast to move, and what path to follow. For example, the G-code machine instructions can instruct a cutting tool to be moved according to the G-code machine instructions through a toolpath cutting away material to leave only the finished 3D object. The same concept also extends to noncutting tools such as forming or burnishing tools, photoplotting, additive methods such as 3D printing, and measuring instruments. However, it should be appreciated that a skilled artisan can employ other programming languages and instruction types for the machine instructions, as desired.

The security module 104 can also be configured to receive the 3D object data and interfacing settings from the system server 106. The security module 104 can be configured to convert the 3D object data and the interfacing settings to the machine instructions. The interfacing settings can include information and values that relate to a particular type of the mechanical processing machine 102. In specific examples, the interfacing settings assists in converting the 3D object data into layers for the machine instructions. This can allow the machine instructions to direct movement and function of the mechanical processing machine 102 to manufacture the 3D object layer by layer, regardless of the particular type of mechanical processing machine 102. Advantageously, the interfacing settings can be compatible with a broad range of mechanical processing machines 102. The interfacing settings can also include information and values that relate to a particular type of the 3D object data. This can allow the machine instructions to direct the manufacture of the 3D object according to the requirements of the 3D object data. Non-limiting examples of the interfacing settings can include slicer settings. The interfacing settings can also include slicer pre-execution settings. The slicer pre-execution settings can be transmitted to the mechanical processing machine 102 to perform pre-execution tasks, such as pre-heating the mechanical processing machine 102. It should be appreciated that a person skilled in the art can employ additional setting and features for the interfacing settings, within the scope of this disclosure.

The security module 104 can include a dedicated device, also known as a node. The dedicated device can be configured to perform the conversion of the 3D object data and interfacing settings. In certain examples, the dedicated device can have a processor and memory. The memory of the security module can include a tangible non-transitory computer readable medium with processor-executable instructions stored thereon. The processor-executable instructions of the security module can be configured to perform the conversion of the 3D object data and the interfacing settings. Desirably, this can provide additional computing power to the system 100 by offloading the conversion of the 3D object and interfacing setting to the dedicated device. Non-limiting examples of the dedicated device include single-board computers, such as a Raspberry Pi™ or Arduino single-board computers. It should be appreciated that one skilled in the art can employ different types of hardware for the dedicated device, as desired. For example, the security module 104 can be a part of the mechanical processing machine 102. The security module 104 can also include software applications and other features that can assist in the performing the conversion of the 3D object data and the interfacing settings to the machine instructions.

The system server 106 can be in communication with the security module 104. The system server 106 can communicate via a LAN and WAN, e.g., the Internet. However, it should be appreciated that one skilled in the art can employ other communications methods for the system server 106, as desired. The system server 106 can include a processor, a memory, and a marketplace subsystem. The memory can have a tangible non-transitory computer readable medium with processor-executable instructions stored thereon. It should be appreciated that the system server 106 can include a plurality of system servers 106, within the scope of this disclosure.

The marketplace subsystem 110 is configured to provide a hub for the content creators 108 to sell "prints" or manufacturing instances of the 3D object data. In other words, the marketplace subsystem 110 can permit a user 112 to purchase the ability to have the mechanical processing machine 102 manufacture one or more instances of the 3D object based on the 3D object data. However, as mentioned previously, the 3D object is manufactured using the machine instructions, instead of the 3D object data. It is believed without being bound to a particular theory, that manufacturing the 3D object with the machine instructions can allow for more security for the content creator 108. In particular, the user 112 is less likely to intercept the 3D object data from the security module 104 to the machine processing machine. Advantageously, this can allow for businesses, and even solo contractors, to control distribution of the 3D object data and the revenue associated therewith. For example, businesses and solo contractors can make money through the creation of 3D object data, while militating against unauthorized capture, copying, redistribution, and/or modification of the 3D object data, including instances where the 3D object data can be considered stolen and/or illegally redistributed by users 112.

The marketplace subsystem 110 can include a content creator module and a user module. The content creator module can be configured to receive and store at least one of the 3D object data, the interfacing settings, and the machine instructions, and combinations thereof. Desirably, this gives the content creator 108 several options to upload to the system server 106. For example, the content creator 108 could provide both the 3D object data and the interfacing settings to the content creator module. Desirably, this can allow the content creator 108 to more finely tune the interfacing settings, which can result in the mechanical processing machine 102 to more accurately manufacture the 3D object. The content creator 108 can also just upload the machine instructions themselves. Advantageously, this can permit the content creator 108 more finely tune the machine instructions.

In addition, the content creator 108 can upload just the 3D object data. The system 100 can then convert the 3D object data to the machine instructions to militate against unauthorized capture, copying, redistribution, and/or modification of the 3D object. If the content creator 108 does not upload the interfacing settings, then the interfacing settings can be provided by at least one of the system server 106 and the user 112. The system server 106 can populate the interfacing settings by the industry standard default settings for that particular mechanical processing machine 102. The industry standard settings can be based on information provided by third party slicing applications. Non-limiting examples of third-party slicing applications include CURA™ 3D printing software. It should be appreciated that one skilled in the art can select other sources for the industry standard can include information provided by other sources, as desired.

In certain examples, the system server 106 can include an interfacing repository. The interfacing repository is configured to store new interfacing settings based on a substantially successful manufacturing of the 3D object. The substantially successful manufacturing can be based on how accurate or how fast the manufacturing of the 3D object was performed by the mechanical processing machine 102. It should be appreciated that other factors can also attribute to evaluate how successful the manufacturing of the 3D object. Desirably, this automatically stores interfacing settings that have been shown to be useful. The system server 106 can permit the user 112 to review previously stored interfacing settings in the interfacing repository based on factors, such as the speed and accuracy of the mechanical processing machine 102 preforming the manufacturing of the 3D object. Advantageously, the user 112 can then select a previously stored interfacing settings from the interfacing repository based on reviews made by other users 112. It should be appreciated that the reviews can be based on other factors, within the scope of this disclosure.

The content creator module can be further configured to permit the content creator 108 to set a purchase price, a number of prints, and an access time period. The purchase price can include the cost to the user 112 for each manufacturing of the 3D object. The purchase price can be based on the number of prints the user receives for the manufacturing of the 3D object. The number of prints can include a number of times the mechanical processing machine can manufacture the 3D object per sale. In certain examples, the purchase price includes the cost to the user 112 for unlimited manufacturing of the 3D object for the access time period. The access time period can be a period of time when the user 112 can receive the manufacturing of the 3D object. The access time period can be a lifetime license to receive the manufacturing of the 3D object. It should be appreciated that a skilled artisan can employ addition tools for the content creator 108 to allow for more limitations to be placed on a purchase by the user 112. In addition, the content creator module can employ different methods for purchasing the order of manufacturing of the 3D object, as desired. For example, the content creator module can include a subscription service. The subscription service can include allowing the user 112 to order prints from a specific content creator 108 by paying the reoccurring fee. In certain examples, the subscription service can include permitting the user 112 to order prints from multiple content creators 108 by paying the reoccurring fee. In addition, the subscription service can also include permitting the user 112 to print a specific 3D object or specific 3D objects by paying the reoccurring fee. Also, the access time can be structured in different ways, within the scope of this disclosure.

The user module can be configured to permit the user 112 to upload, select, and modify the interfacing settings. Desirably, this allows the user 112 to upload, select, or modify the interfacing settings so that the interfacing settings can substantially match the mechanical processing machine 102. In addition, the user 112 is also allowed to selectively modify the interfacing settings prior to the interfacing settings and the 3D object code being converted to the machine instructions. Advantageously, this can give the user 112 more freedom to customize how the mechanical processing machine 102 manufactures the 3D object.

The user module can also be configured to permit the user 112 to order a manufacturing of the 3D object. Desirably, this allows the user 112 to purchase the manufacturing of the 3D object without getting access to the 3D object data. It is believed that this can militate against unauthorized capture, copying, redistribution, and/or modification of the 3D object data. The user module can be further configured to display a preview of the 3D object to be manufactured. The preview can be a two-dimensional (2D) image generated based on the 3D object file data. In certain examples, the preview is a full 3D image based on the 3D object file data. Advantageously, this can permit the user 112 to readily ascertain what the 3D object is before purchasing. It should be appreciated that the content creator module and the user module can add additional features, within the scope of this disclosure.

The marketplace subsystem 110 can include a software application. Desirably, this can permit the content creator 108 and the user 112 to interact with the subsystem 110 in a more convenient manner. The software application can be a web application. The web application can permit the content creator 108 and the user 112 to interact with the marketplace subsystem 110 through a web browser, instead of having to download a dedicated software application. In certain examples, the software application is a mobile application. Desirably, this can permit the content creator 108 and the user 112 to access the marketplace subsystem 110 remotely with a mobile device.

The system server 106 is can configured to convert the 3D object data and the interfacing settings to the machine instructions and transmit the machine instructions to the security module 104. In certain examples, the processor-executable instructions of the system server can be configured to convert the 3D object data and the interfacing settings to the machine instructions. Desirably, the conversion to the machine instructions can take place entirely on the system server 106, which can further militate against the user 112 from intercepting the 3D object data. In certain examples, and as alluded to previously, the system server 106 can be configured to transmit the 3D object data and the interfacing settings to the security module 104. This offloads the conversion to the security module 104 which can reduce the load on the system server 106. It should be appreciated that one skilled in the art can employ other methods of converting the 3D object data and the interfacing settings to the machine instructions, within the scope of this disclosure.

In some embodiments, the manufacturing system 100 can have a node connected electronics 114, as shown in FIG. 2. The node connected electronics 114 can include sensors, cameras, and other electronics that can enable the system server 106 to measure manufacturing operational information during the operation of the mechanical processing machine 102. The node connected electronics 114 can be in communication with the mechanical processing machine 102 and the system server 106. The node connected electronics 114 can be configured to measure the manufacturing operational information during the manufacturing of the 3D object. The operational information can include temperature, pressure, and force readings. It should be appreciated that a person skilled in the art can select different information to be measured for the operational information, as desired. Desirably, the system server 106 can use the operational information to make adjustments to the at least one of the 3D object data, the interfacing settings, and the machine instructions. The system server 106 can include at least of machine learning, artificial intelligence (AI), and pattern recognition. Advantageously, this can be used in combination with the operational information to make automatic adjustments that can increase the quality and speed of the manufacturing of the 3D object.

Non-limiting examples of sensors for the node connected electronics 114 can include one or more vision and imaging sensors, temperature sensors, radiation sensors, proximity sensors, pressure sensors, positioning sensors, photoelectric sensors, particle sensors, motion sensors, metal sensors, level sensors, leak sensors, humidity sensors, gas sensors, chemical sensors, force sensors, flow sensors, flaw sensors, flame sensors, electrical sensors, contact sensors, and/or non-contact sensors. It should be appreciated that a skilled artisan can employ different sensors node connected electronics 114, within the scope of this disclosure.

In further embodiments, the mechanical processing machine 102 includes machines that can be configured to preform functions other than manufacturing the 3D object. In certain examples, the mechanical processing machine 102 is configured to perform at least one movement. Desirably, this can permit the system 100 to remotely and securely control the at least one movement of the mechanical processing machine 102. The node connected electronics 114 can be configured to measure the manufacturing operation information during the at least one movement of the mechanical processing machine 102. Advantageously, the system server 106 can use the operational information to make adjustments to movement of the mechanical processing machine 102 during operation.

Figure 3:
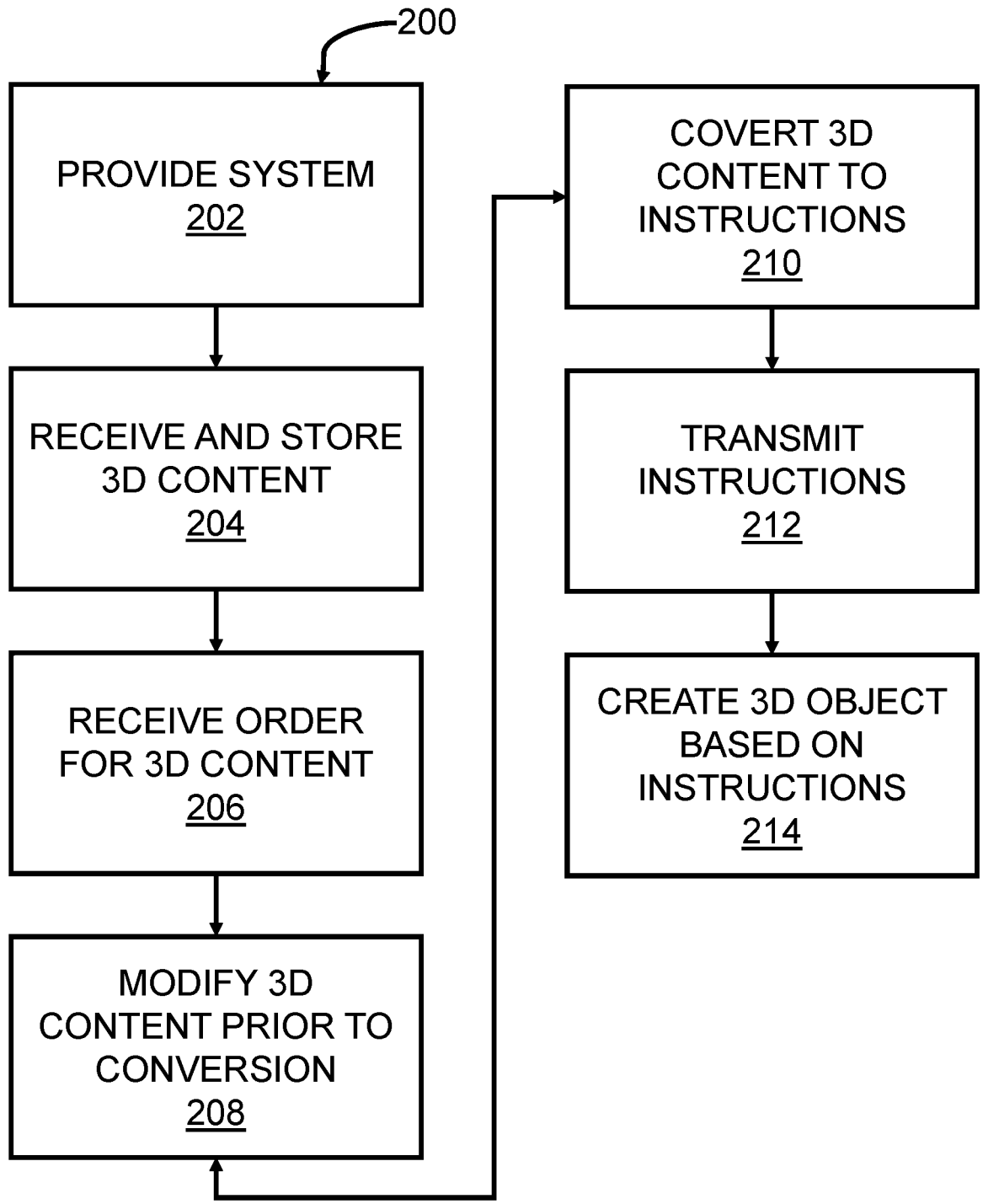
FIG. 3 is a flow chart illustrating an embodiment of a method for using the manufacturing system according to the present technology.

With reference to FIG. 3, a method 200 for securely and remotely manufacturing a 3D object includes a step 202 of providing a manufacturing system 100. As discussed, this can include the sensor 114, which can provide additional operational information. In a step 204, system server 106 receives and stores the at least one of 3D object data, the machine instructions, the interfacing settings, and combinations thereof. The interfacing settings can also be provided by the system server 106 and the user 112. The system server 106 can receive the order for the manufacture of the 3D object from the user 112, in a step 206. In a step 208, the user 112 can selectively modify the interfacing settings. This can allow the user 112 to modify the interfacing settings so that the interfacing settings can substantially match the mechanical processing machine 102. In a step 210, the 3D object data and the interfacing settings can be converted to the machine instructions. As mentioned above, the conversion can be accomplished by at least one of the security module 104 and the system server 106. Advantageously, this can permit businesses and solo contractors, to control distribution of the 3D object data and the revenue associated therewith, while militating against unauthorized capture, copying, redistribution, and/or modification of the 3D object data by the users 112. The mechanical processing machine 102 can manufacture the 3D object as directed by the machine instructions, in a step 212. Desirably, this can permit the user 112 to receive the 3D object that the user 112 has purchased from the marketplace subsystem 110. The user 112 does not receive the 3D object data.

Advantageously, the system 100 and method 200 can securely and remotely manufacturing the 3D object. The system 100 and method 200 permit the 3D object data and the interfacing settings to be converted into machine instructions. It is believed that this can militate against the user 112 from receiving the 3D object data and subsequently capturing, copying, and/or redistributing the 3D object data when not authorized to do so. In addition, the system 100 and method 200 permit the user 112 to customize how the mechanical processing machine 102 is remotely controlled. In particular, the user 112 can modify the interfacing settings prior to the conversion to the machine instructions. Desirably, this can permit the user 112 to modify the interfacing settings so that the interfacing settings can substantially match the mechanical processing machine 102.

While certain representative embodiments and details have been shown for purposes of illustrating the invention, it will be apparent to those skilled in the art that various changes can be made without departing from the scope of the disclosure, which is further described in the following appended claims.

What is claimed is:

1. A manufacturing system for securely and remotely manufacturing a three-dimensional (3D) object, comprising:
   a mechanical processing machine configured to manufacture the 3D object;
   a security module in communication with the mechanical processing machine, the security module configured to transmit machine instructions to the mechanical processing machine, the machine instructions configured to direct the mechanical processing machine how to manufacture the 3D object;
   a system server in communication with the security module, the system server having a processor, a memory, and a marketplace subsystem, the memory including a tangible, non-transitory computer readable medium with processor-executable instructions stored thereon, the marketplace subsystem having a content creator module and a user module, the content creator module configured to receive and store at least one of 3D object data, interfacing settings, the machine instructions, and combinations thereof, the user module configured to permit a user to order a manufacturing of the 3D object; and
   security means associated with the content creator module for selectively preventing the 3D object data from being transmitted to the mechanical processing machine and for preventing the 3D object data from being accessed by the user.

2. The manufacturing system of claim 1, wherein the processor-executable instructions of the system server are configured to convert the 3D object data and the interfacing settings to the machine instructions and transmit only the machine instructions to the security module.

3. The manufacturing system of claim 1, wherein the processor-executable instructions of the system server are configured to transmit the 3D object data and the interfacing settings and to the security module.

4. The manufacturing system of claim 3, wherein the security module is configured to convert the 3D object data and the interfacing settings to the machine instructions and transmit only the machine instructions to the mechanical processing machine.

5. The manufacturing system of claim 1, wherein the security module includes a dedicated hardware device.

6. The manufacturing system of claim 1, wherein the security module is a part of the mechanical processing machine.

7. The manufacturing system of claim 1, wherein the marketplace subsystem includes a software application.

8. The manufacturing system of claim 7, wherein the software application includes a web application accessed by a web browser.

9. The manufacturing system of claim 7, wherein the software application includes a mobile application accessed by a mobile device.

10. The manufacturing system of claim 1, wherein the interfacing settings are provided by at least one of the content creator, the system server, the user, and combinations thereof.

11. The manufacturing system of claim 10, wherein the interfacing settings are configured to be selectively modified by the user before at least one of the 3D object data and the interfacing settings are converted to machine instructions.

12. The manufacturing system of claim 10, wherein the system server further includes an interfacing repository configured to store new interfacing settings based on a successful manufacturing of the 3D object.

13. The manufacturing system of claim 12, wherein the new interfacing settings stored in the interfacing setting repository are configured to be reviewed by at least one user according to factors including speed and accuracy of the mechanical processing machine performing the manufacturing of the 3D object.

14. The manufacturing system of claim 13, wherein the user selects a previously stored interfacing setting in the interfacing repository for the interfacing settings based on at least one review by the at least one user.

15. The manufacturing system of claim 1, wherein the 3D object data includes a single 3D object file that is used to manufacture a plurality of independent objects, each of the independent objects forming a part of an assembly.

16. The manufacturing system of claim 1, wherein the 3D object data includes a plurality of 3D object files used to manufacture a plurality of independent objects, each of the independent objects forming a part of an assembly.

17. The manufacturing system of claim 1, furthering comprising a sensor configured to measure manufacturing operational information during the manufacturing of the 3D object.

18. The manufacturing system of claim 1, wherein the content creator module is further configured to permit the content creator set a purchase price on the number of prints the user receives for the manufacturing of the 3D object, and the number of prints being a number of times the mechanical processing machine can manufacture the 3D object per sale.

19. The manufacturing system of claim 1, wherein the content creator module is further configured to permit the content creator set a purchase price by access time, the access time being a time interval where the user receives access the manufacturing of the 3D object that the mechanical processing machine can manufacture the 3D object per sale.

20. The manufacturing system of claim 1, wherein the content creator module further includes a subscription service, the subscription service configured to permit the user to order the manufacturing of at least one specific 3D object by paying a reoccurring fee.

21. The manufacturing system of claim 1, wherein the content creator module further includes a subscription service, the subscription service configured to permit the user to order the manufacturing of the 3D object from at least on specific content creator by paying a reoccurring fee.

22. A manufacturing system for securely and remotely manufacturing a three-dimensional (3D) object, comprising:
   a mechanical processing machine configured to manufacture the 3D object;
   a security module in communication with the mechanical processing machine, the security module configured to transmit machine instructions to the mechanical processing machine, the machine instructions configured to direct the mechanical processing machine how to manufacture the 3D object;
   a system server in communication with the security module, the system server having a processor, a memory, and a marketplace subsystem, the memory including a tangible, non-transitory computer readable medium with processor-executable instructions stored thereon, the marketplace subsystem having a content creator module and a user module, the content creator module configured to receive and store at least one of 3D object data, interfacing settings, and the machine instructions, and combinations thereof, and the user module configured to permit the user to order a manufacturing of the 3D object and selectively modify the interfacing settings before the 3D object data and the interfacing settings are converted to machine instructions, and the processor-executable instructions of the system server configured to convert the 3D object data and the interfacing instructions to the machine instructions and transmit the machine instructions to the security module, and
   security means associated with the content creator module for selectively preventing the 3D object data from being transmitted to the mechanical processing machine and for preventing the 3D object data from being accessed by the user.

23. A method for securely and remotely manufacturing a three-dimensional (3D) object, comprising:
   providing a manufacturing system including a mechanical processing machine configured to manufacture the 3D object, a security module in communication with the mechanical processing machine, the security module configured to transmit machine instructions to the mechanical processing machine, the machine instructions configured to direct the mechanical processing machine how to manufacture the 3D object, a system server in communication with the security module, the system server having a processor, a memory, and a marketplace subsystem, the memory including a tangible, non-transitory computer readable medium with processor-executable instructions stored thereon, the marketplace subsystem having a content creator module and a user module, the content creator module configured to receive and store at least one of 3D object data, interfacing settings, the machine instructions, and combinations thereof, the user module configured to permit a user to order a manufacturing of the 3D object;
   receiving and storing, by the system server, at least one of the 3D object data, the interfacing settings, the machine instructions, and combinations thereof;

receiving, by the system server, an order for the manufacture of the 3D object from the user;
selectively modifying, by the user, the interfacing settings;
converting the 3D object data and the interfacing settings to the machine instructions;
transmitting only the machine instructions, by the security module, to the mechanical processing machine;
selectively preventing transmission of the 3D object data to the mechanical processing machine and securing the 3D object data from being accessed by the user; and
manufacturing the 3D object, by the mechanical processing machine, directed by the machine instructions.

* * * * *